United States Patent
Atsushi

(10) Patent No.: US 8,978,847 B2
(45) Date of Patent: Mar. 17, 2015

(54) ELECTRONICALLY CONTROLLED PRESSURIZED DAMPER

(75) Inventor: Ishii Atsushi, Upplands Väsby (SE)

(73) Assignee: Ohlinis Racing AB, Upplands Vasby (SE)

( * ) Notice: Subject to any disclaimer, the term of this patent is extended or adjusted under 35 U.S.C. 154(b) by 1620 days.

(21) Appl. No.: 12/280,464

(22) PCT Filed: Feb. 23, 2007

(86) PCT No.: PCT/SE2007/000168
§ 371 (c)(1),
(2), (4) Date: Nov. 20, 2008

(87) PCT Pub. No.: WO2007/097699
PCT Pub. Date: Aug. 30, 2007

(65) Prior Publication Data
US 2009/0166989 A1    Jul. 2, 2009

(30) Foreign Application Priority Data

Feb. 23, 2006 (SE) .................. 0600403

(51) Int. Cl.
*F16F 9/46* (2006.01)
*B60G 17/04* (2006.01)
*B60G 17/08* (2006.01)

(52) U.S. Cl.
CPC ............ *F16F 9/46* (2013.01); *B60G 17/0416* (2013.01); *B60G 17/08* (2013.01); *B60G 2202/154* (2013.01); *B60G 2202/414* (2013.01); *B60G 2500/114* (2013.01)
USPC ................. 188/314; 188/266.5; 280/5.515

(58) Field of Classification Search
CPC ............. F16F 9/44; F16F 9/46; F16F 9/462; F16F 9/465; F16F 9/512; B60G 2500/10; B60G 2400/204; B60G 2600/26; B60G 17/08

USPC ................. 188/314, 229.1, 318
See application file for complete search history.

(56) References Cited

U.S. PATENT DOCUMENTS 4,655,440 A * 4/1987 Eckert .............. 267/64.11
4,730,816 A * 3/1988 Eckert .............. 267/64.11
(Continued)

FOREIGN PATENT DOCUMENTS

GB     2378231      2/2003
SE      443622      3/1986
(Continued)

OTHER PUBLICATIONS

International Search Report; dated May 28, 2007; 4 pages.

*Primary Examiner* — Anna Momper
*Assistant Examiner* — San Aung
(74) *Attorney, Agent, or Firm* — Knobbe Martens Olson & Bear, LLP

(57) ABSTRACT

A vehicle damper comprises a damping medium-filled damper body in which an element divides the damper body into two chambers. A microprocessor control unit is coupled to one or more valve and connecting arrangements that comprise at least one valve and a number of flow ducts. Respective valves and flow ducts of the valve and connecting arrangement are coupled both to respective damper chambers and a pressurizing element common to both of the chambers so that even in the chamber in which a low pressure prevails there is a positive pressure acting at all times. The valve and connecting arrangements comprise a continuously electrically controlled main valve, a non-return valve and one or more bleed valves.

15 Claims, 6 Drawing Sheets

(56) References Cited

U.S. PATENT DOCUMENTS

| | | |
|---|---|---|
| 5,090,525 A | 2/1992 | Ohlin |
| 5,222,759 A * | 6/1993 | Wanner et al. ............. 280/5.515 |
| 5,570,286 A * | 10/1996 | Margolis et al. ................ 701/36 |
| 5,586,627 A | 12/1996 | Nezu et al. |
| 5,862,894 A | 1/1999 | Boichot et al. |
| 5,873,437 A * | 2/1999 | Danek ....................... 188/282.2 |
| 6,112,866 A | 9/2000 | Boichot et al. |

FOREIGN PATENT DOCUMENTS

| | | |
|---|---|---|
| SE | 466514 | 2/1992 |
| WO | WO 85/04698 | 10/1985 |

* cited by examiner

ELECTRONICALLY CONTROLLED PRESSURIZED DAMPER

CROSS-REFERENCE TO RELATED APPLICATIONS

This application claims the benefit and priority to and is a U.S. National Phase of PCT International Application Number PCT/SE2007/000168, filed on Feb. 23, 2007, designating the United States of America and published in the English language, which claims priority under 35 U.S.C. §119 to Swedish Application Number 0600403-0, filed on Feb. 23, 2006. The disclosures of the above-referenced applications are hereby expressly incorporated by reference in their entireties.

BACKGROUND OF THE INVENTION

1. Field of the Invention

The present invention generally relates to a device in a vehicle damper that comprises a damping medium-filled damper body in which an element forming a seal against the damper body moves with a reciprocating stroke caused by relative movement between two parts of the vehicle. The element forming a seal against the damper body divides the damper body into two chambers and has a low-pressure side and a high-pressure side owing to the pressure differences in the damping medium under the induced movement. One or more valve and connecting arrangements couple the two damper chambers to a pressurizing element common to both of the chambers so that even in the low pressure chamber there is a positive pressure acting at all times, so that the damping force characteristic in both stroke directions can be adjusted separately and independently of one another. A continuous electrical signal, which is based on events registered by sensors and adjusted by a microprocessor control unit, controls a first part of the damping force characteristic of the damper by regulating flow through a first damping duct in the valve and connecting arrangement(s). A second part of the damping force characteristic of the damper is controlled by a further valve that is separated from the valve and connecting arrangement and that is located in a second damping duct.

2. Description of the Related Art

Electrically controlled valves in a damper are disclosed, for example, by SE 443622, SE 466514 and GB 2378231. The flow through these valves is determined by an electrically controlled pressure regulator, which forms a main restrictor in the damper. The pressure regulation is brought about by an equilibrium of forces between forces caused by pressure in a damper chamber and, among other things, force of a pilot valve, which is controlled by a solenoid that is electrically coupled to an adjusting device. In SE 443622, the pilot valve is continuously adjusted by a control signal, while the adjustment in SE 446514 and GB 2378231 is performed manually. The signal delivered by the control unit can be pre-programmed to adjust the damper so that the settings can be varied. For example, the settings can be varied according to the driver's style of driving, the vehicle performance, the state of the road or the like. In SE 443622 and SE 446514, the flow is adjusted directly via the damping piston, which divides the damping cylinder into a compression chamber and a return chamber respectively.

GB 2378231 describes a damper that has a valve for adjusting the damping forces on a compression stroke and another valve for adjusting the damping forces on a return stroke. The compression and return valves are coupled via a common chamber so that, on a return stroke, the damping medium flows between the return chamber and the compression chamber. On a compression stroke, on the other hand, the damping medium flows between the compression chamber and a medium-receiving reservoir. Two different types of valves are used for compression and return and only high-speed damping is adjustable from the damper.

In addition, U.S. Pat. No. 5,586,627 describes an electrically controlled damper that has a pressure reservoir. In FIG. 18 in U.S. Pat. No. 5,586,627, a damper is shown that is pressurized on the high-pressure side of the piston and in which the pressurized damping medium is led via a valve device to the low-pressure side of the piston. Both the compression damping and the return damping are adjusted by one and the same valve device. Other figures also show a damper that has a separate compression valve and a separate return valve, in which the pressure reservoir is intended to pressurize the oil with which the damper is filled and to accommodate changes in the volume of oil due to temperature differences or piston rod displacement.

The main problem that has to be overcome with the dampers described above is how, in a simple way, to combine the functions of a positive pressure build-up, in which the damping medium flow in both stroke directions can be adjusted quite separately and independently of one another, with a simple and inexpensive continuously adjustable electric control of the entire damping force characteristic or parts thereof.

The continuously adjustable dampers hitherto known, for example SE 443622, in which the damping force characteristic is determined by a signal from a control unit, have a certain delay before the valve reaches the required position. The lag in the system is caused by, for example, the friction of the separate valve parts against one another and, as a consequence, it takes between 8 and 12 msec for the valve to adjust to the new position. This lag is particularly manifest when only one valve determines the damping force characteristic of the damper such as, for example, when the single valve is seated in the damping piston.

Yet another problem can arise during rapid continuous adjustment of the damping force characteristic based upon output signals delivered by vehicle sensors. When the sensors detect a change in the nature of the road surface, the driver's style of driving or the like, it is desired that the electrically controlled valve can be adjusted to the optimum damping force characteristic on the next stroke. With previously known dampers, such near instantaneous adjustment is complicated because a damper without a positive pressure build-up on the low-pressure side of the piston lacks the capacity to adjust the return and compression damping quite independently of one another. To reduce the likelihood of cavitation with a damper of a hitherto known type, the damping force characteristics in the opposite stroke directions must be adjusted to correlate with one another. Preparing a valve for the next stroke without taking account of the damping force characteristic of the present stroke is therefore impossible because the stroke must be completed before the damping force characteristic of the valve can be changed. Owing to the time lag of the valves, the adjustment also occurs with a time lag, which can give rise to an unwanted damping force characteristic and a risk of cavitation, which is particularly manifest in the case of rapid strokes and changes of position.

It is desirable in the case of slow strokes and changes of position to be able to adjust the damping force characteristic simply, without significantly affecting the high-speed damping.

It is also desirable to provide an economic damper design in which the same valve construction can be used on both the compression and the return valve.

SUMMARY OF THE INVENTION

The invention as claimed in claim 1 describes a device comprising a damping medium-filled damper body in which an element forming a seal against the damper body, for example a piston or an arm, moves with a stroke induced by the relative movement between two parts of the vehicle, for example the chassis and a wheel/runner or the chassis and handlebars. The element forming a seal against the damper body divides the damper body into two chambers and has a low-pressure side and a high-pressure side owing to the pressure differences in the damping medium under said movement that is induced. A valve and connecting arrangement couples each of the damper chambers to a pressurizing element common to both of the chambers, so that even in the chamber in which a low pressure prevails there is a positive pressure acting at all times. A microprocessor control unit emits a continuous electrical signal, which controls parts of the damping force characteristic of the damper by adjusting the flow through at least one of the valve and connecting arrangements.

Sensors fitted to the vehicle and the damper supply the control unit with information on the state of the vehicle and the damper, and the control unit then uses the status information in order to calculate a suitable output signal, which is then sent to the valves, producing a varied damping.

The valve and connecting arrangement comprises at least one valve and a number of ducts. The arrangement preferably comprises an electrically controlled valve coupled in parallel to two non-return valves. These non-return valves are designed so that the pressurizing element is always coupled to the low-pressure side of the damper.

Since a pressurizing element is always coupled to the low-pressure side of the damper, this ensures that the pressure on the low-pressure side never becomes less than zero. Hence, there is a positive pressure build-up on the low-pressure side at all times. The fact that positive pressure build-up prevails means that the likelihood of cavitation can be greatly reduced and the damping force characteristics in both stroke directions can be adjusted quite separately and independently of one another.

By using two individually adjustable valves, the electrically controlled valve can already be prepared and adjusted to the optimum damping force characteristic for the next stroke while the current stroke is in progress. With this solution, the signal time lag affects neither the working nor the characteristic of the damper.

In the case of small strokes or slow movements, the damping medium flows through a separate leakage flow duct, which is a so-called "bleed duct". The duct either may be located directly in the part that separates the damper chamber into two parts, or may be located outside the damper chamber. Preferably, the leakage flow duct is located parallel to the valve and connecting arrangement. For example, the leakage flow duct may be located in the same outer housing as that in which the valves are fitted. The flow area of the duct may be either predetermined or adjustable.

Since the damping medium flows the same way through both the compression valve and the return valve, the same type of valve can be used for both stroke directions, which makes the design both easier and cheaper to produce.

An even simpler construction can be achieved by replacing one of the continuously controlled valves with a discretely controlled valve. The discrete valve may be embodied in a number of different ways. For example, in some embodiments, the discrete valve may be formed by a control unit programmed with a number of predetermined signal values or by a purely mechanical adjustment of the flow aperture through the valve. By placing a leakage flow duct parallel to the valve and connecting arrangement, low-speed damping can be adjusted separately from high-speed damping and the electrically adjustable valves can be adjusted to the correct damping characteristic while the damper is set up for small strokes and slow movements. A cheaper and simpler valve construction also can be used for the electrically controlled valves.

BRIEF DESCRIPTION OF THE DRAWINGS

The invention is described in more detail below, with reference to the drawings attached, in which.

DETAILED DESCRIPTION OF THE PREFERRED EMBODIMENT

Figure 1A:
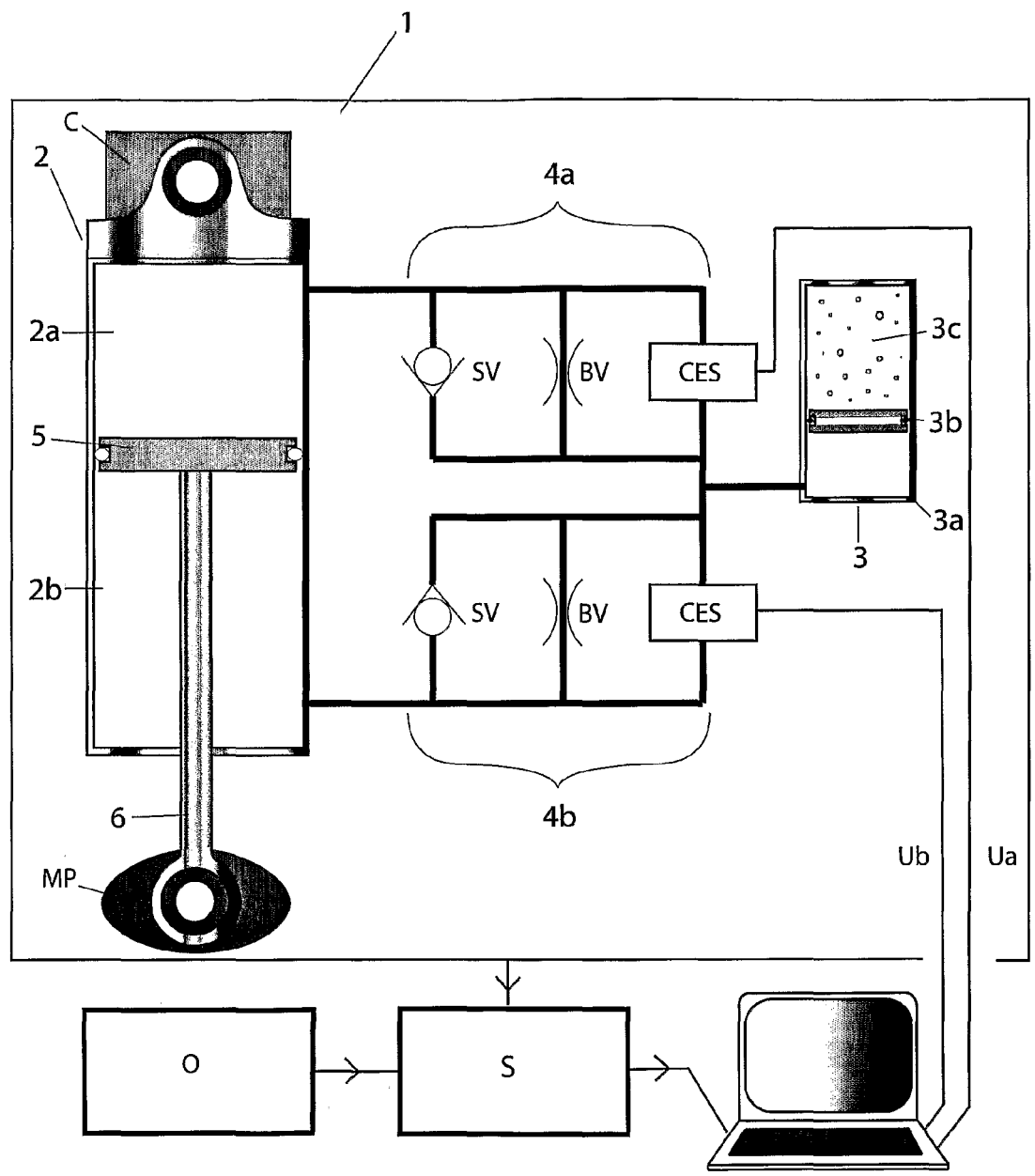
FIG. 1a shows a device that is arranged and configured in accordance with a first embodiment of the invention.

FIGS. 1a, 1b, 1c and 2 show schematic diagrams of several embodiments of damper devices that are arranged and configured in accordance with certain features, aspects and advantages of the present invention.

The damper device 1 is designed to damp the movement between a fixed part C and a moving part MP of a vehicle. The vehicle can comprise, for example but without limitation, a car, a motorcycle, a snowmobile or an ATV. The fixed part C is, for example but without limitation, a part of a vehicle chassis while the moving part MP may be a wheel, a ski, a runner or a rotatable handlebar, for example but without limitation. The different embodiments of the damper will be explained in more detail below.

The damper device 1 comprises a damper body 2, which preferably is sealed off from the surroundings. An internal volume of the damper body 2 is filled with a damping medium. The internal volume is divided into two damper chambers 2a, 2b, which are separated from each other by an element 5. The element 5, which can be a piston or the like, forms a seal against an inner wall of the damper body. The sealing element 5 moves with a stroke that is determined by relative movements of the vehicle parts C, MP.

During the relative movements, the element 5 moves and, therefore, generates a relatively higher pressure on the side of the element 5 in which the damping medium is compressed and a relatively lower pressure is generated on the side of the element 5 on which the damping medium expands. The damper chambers 2a, 2b, therefore, work alternately with a relatively higher pressure or a relatively lower pressure as their volume respectively diminishes or increases due to movement of the sealing element 5.

A valve and connecting arrangement 4a, 4b (or 4a, 4c in FIG. 1 *c*), which comprises at least one valve and a number of flow ducts. The valve and connecting arrangement 4a, 4b couples each damper chamber 2a, 2b to a pressurizing element 3. The pressurizing element 3 preferably is common to both of the chambers 2a, 2b. In other words, the flow ducts are coupled both to each of the damper chambers 2a, 2b and to the pressurizing element 3 and the flow between the respective parts is adjusted by the valves. The pressurizing element 3 may take the form of a vessel 3a, the interior of which is divided by a floating piston 3b or the like. The floating piston 3b can be subjected to a pressure generated, for example, by gas 3c or a mechanical pressure element, such as a spring 3c' or the like, as shown in FIG. 1b. In some embodiments, the floating piston may also be replaced by a pressurized rubber bladder or the like.

The placement of the pressurizing element 3 serves to control the valve and connecting arrangement 4a, 4b/4c, so that pressurized damping medium is always coupled to the low-pressure chamber 2a/2b, which varies depending upon the direction in which the sealing element 5 moves. The pressure in the lower-pressure chamber 2a/2b therefore always is positive (i.e., greater than zero) and the likelihood of cavitation therefore is greatly reduced.

Adjusting the flow through the valve and connecting arrangement 4a, 4b/4c controls the entire damping force characteristic of the damper 1. The flow adjustment can be made either via a microprocessor control unit SU, which emits a continuous electrical signal Ua, Ub, or via an electrical, mechanical or hydraulic unit 4c (see FIG. 1c), which delivers a discrete predetermined signal or a specific flow, for example. Because the valve and connecting arrangements 4a, 4b/4c are entirely separated from one another at one end by the sealing element 5, the flow in both stroke directions can be adjusted quite independently of each other.

Sensors S fitted to the vehicle register both ambient characteristics O (for example but without limitation, the state of the road, unevenness, etc.) and the status of the damper device 1 (for example but without limitation, stroke length and pressure in each chamber 2a, 2b). Sensors such as accelerometers, pressure sensors, height sensors and angle sensors, for example but without limitation, can be used to measure ambient characteristics and characteristics of the vehicle.

The sensors S supply the control unit SU with status information that is converted by a pre-programmed microprocessor into a suitable output signal Ua, Ub. The output signals Ua, Ub can be used to control the valve and connecting arrangements 4a, 4b. The output signal Ua, Ub can be adjusted to provide precisely the desired damping for the forthcoming events inferred.

Because the valve and connecting arrangements 4a, 4b/4c are separated from one another, it is possible in the case of rapid strokes and swift changes in position to send the output signals Ua, Ub to the respective valve and connecting arrangement 4a, 4b while the current stroke is still in progress. The time lag that occurs before the respective separately continuously controlled valve unit has adjusted to the required position consequently affects neither the functioning nor the characteristic of the damper. The positive pressure build-up in the lower-pressure chamber of the damper means that cavitation is less likely to occur in the damper, which also means that damping in both stroke directions can be optimized independently of each other.

The continuously controlled valve and connecting arrangement 4a, 4b/4c comprises a number of ducts in conjunction with three valve units; a continuously adjustable and electrically controlled main valve CES, a non-return valve SV and a separate valve, a so-called bleed valve BV.

The non-return valve SV preferably is designed so that the pressurizing element 3 is always coupled to the low-pressure side of the damper. The bleed valve BV is designed so that the damping medium passes through the bleed valve BV during small strokes or slow movements in which the forces are not so great that the main valve CES opens. The bleed valve BV, therefor, works in parallel with the main valve CES. During damping of larger strokes or quicker movements, the flow resistance to the larger flows of medium through the bleed valve BV is so great that the damping medium instead flows through the significantly larger flow ducts of the main valve CES.

The bleed valve BV may be located outside the damper chamber (see FIG. 1a), for example it may be located in the same outer housing 7, 15 (see FIGS. 3a and 4) as that in which the main valves CES are fitted. A separate bleed valve BV may also be located directly in the sealing part 5, 5' (e.g., piston), which separates the damper body 2 into two chambers 2a, 2b (see FIGS. 1b and 4).

The flow that the bleed valve BV allows to pass through may be either predetermined or adjustable. The adjustment can be achieved, for example, by exchanging flow-limiting parts, such as shims, or by a separate externally actuatable body that can be located in the duct, the position of which determines the flow. The position can be adjusted manually, electrically, hydraulically, pneumatically or magnetically, for example but without limitation.

Figure 1B:
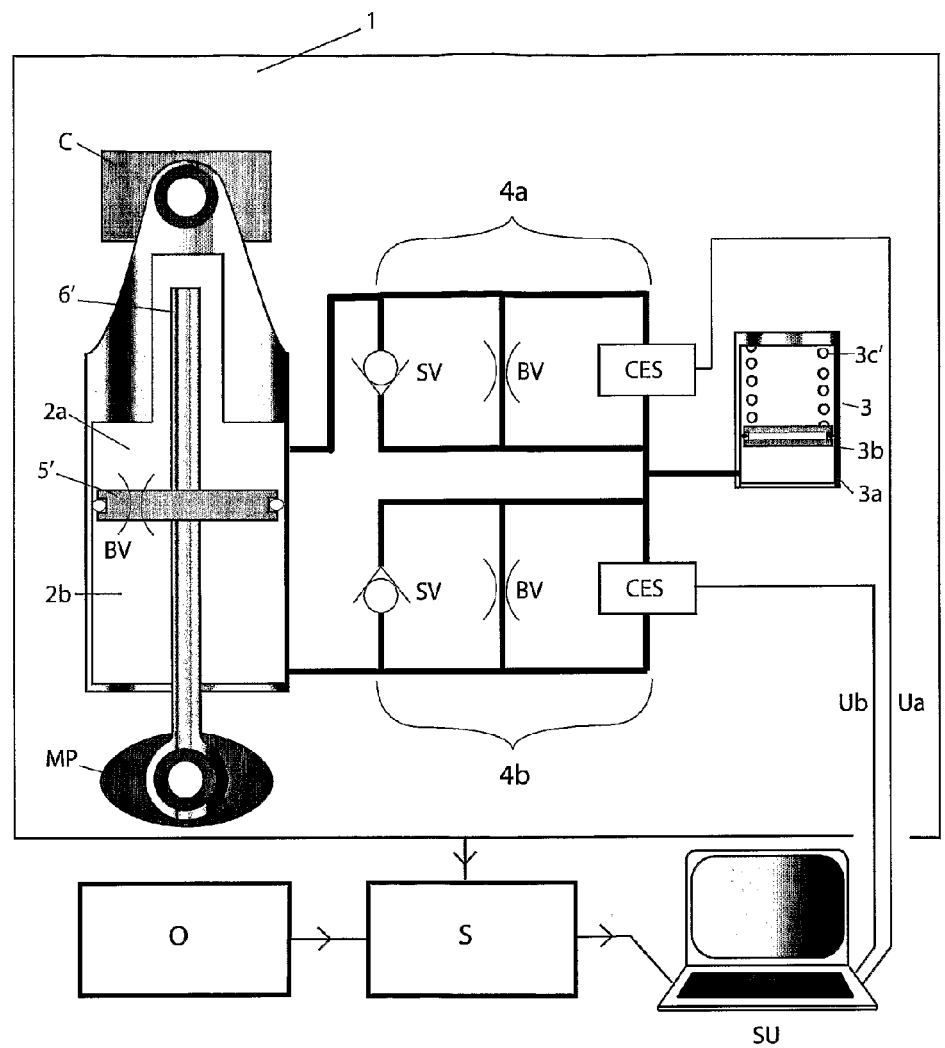
FIG. 1b shows a device that is arranged and configured in accordance with a second embodiment of the invention.

In the embodiment described in FIG. 1a, the body 2 comprises a damping cylinder. The damping cylinder 2 can be divided by a piston 5 into a compression chamber 2a and a return chamber 2b. The piston 5 can be fastened to a piston rod 6, which may extend from one or both sides of the piston 5.

The embodiment with the piston rod 6' passing through the piston 5' is shown in FIG. 1b. With the piston rod 6' passing through the piston 5', the pressurizing element 3 does not need to absorb any damping medium that otherwise would be displaced by the volume of the piston rod. In other words, in an embodiment where the piston rod does not pass through the piston, damping medium is displaced as the piston rod moves into the lower chamber 2b. The pressurizing element 3 can therefore be designed with smaller dimensions and can be adapted to absorb the variations in volume that occur as a result of temperature changes or the like.

Figure 1C:
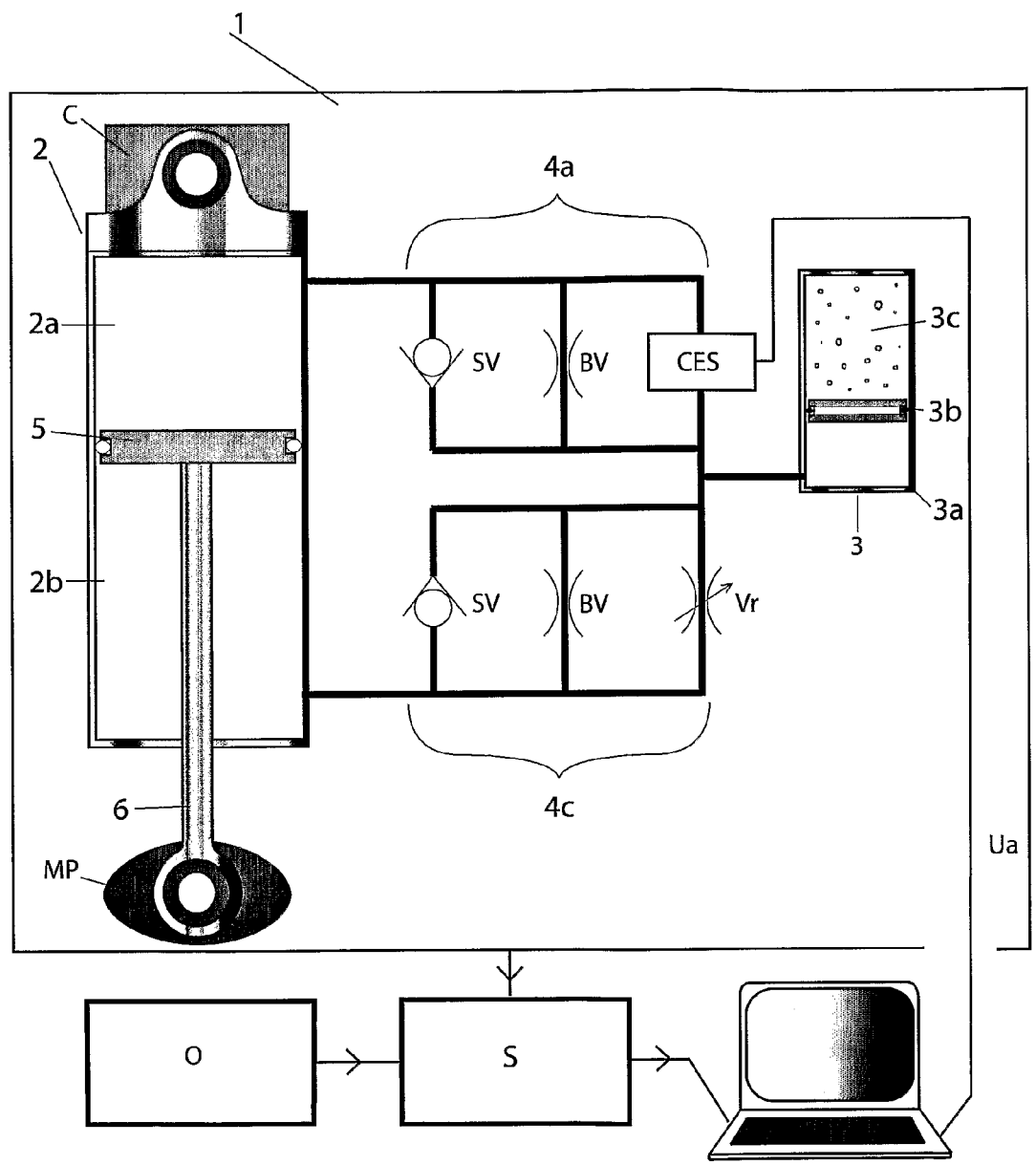
FIG. 1c shows a device that is arranged and configured in accordance with a third embodiment of the invention.

In FIGS. 1a, 1b and 1c the damper device 1 is fixed at one end to the vehicle chassis C, on a car, a motorcycle, a snowmobile or an ATV, for example but without limitation, and at the other end is fixed via the piston rod 6', 6 to a moving part of the vehicle, such as a wheel or a ski MP, for example but without limitation.

FIG. 1c shows an embodiment comparable with the embodiments of FIGS. 1a and 1b, but one of the continuously electrically controlled valves is replaced by a valve unit, which comprises a non-return valve SV, a bleed valve BV and a discretely adjustable valve Vr. The discrete valve Vr may be embodied in a number of different ways. For example but without limitation, the discrete valve may comprise a control unit programmed with a number of predetermined signal values or the discrete valve may comprise a purely mechanical adjustment of the flow aperture through the valve. Making their valve Vr non-microprocessor-controlled affords a less expensive solution.

Figure 2:
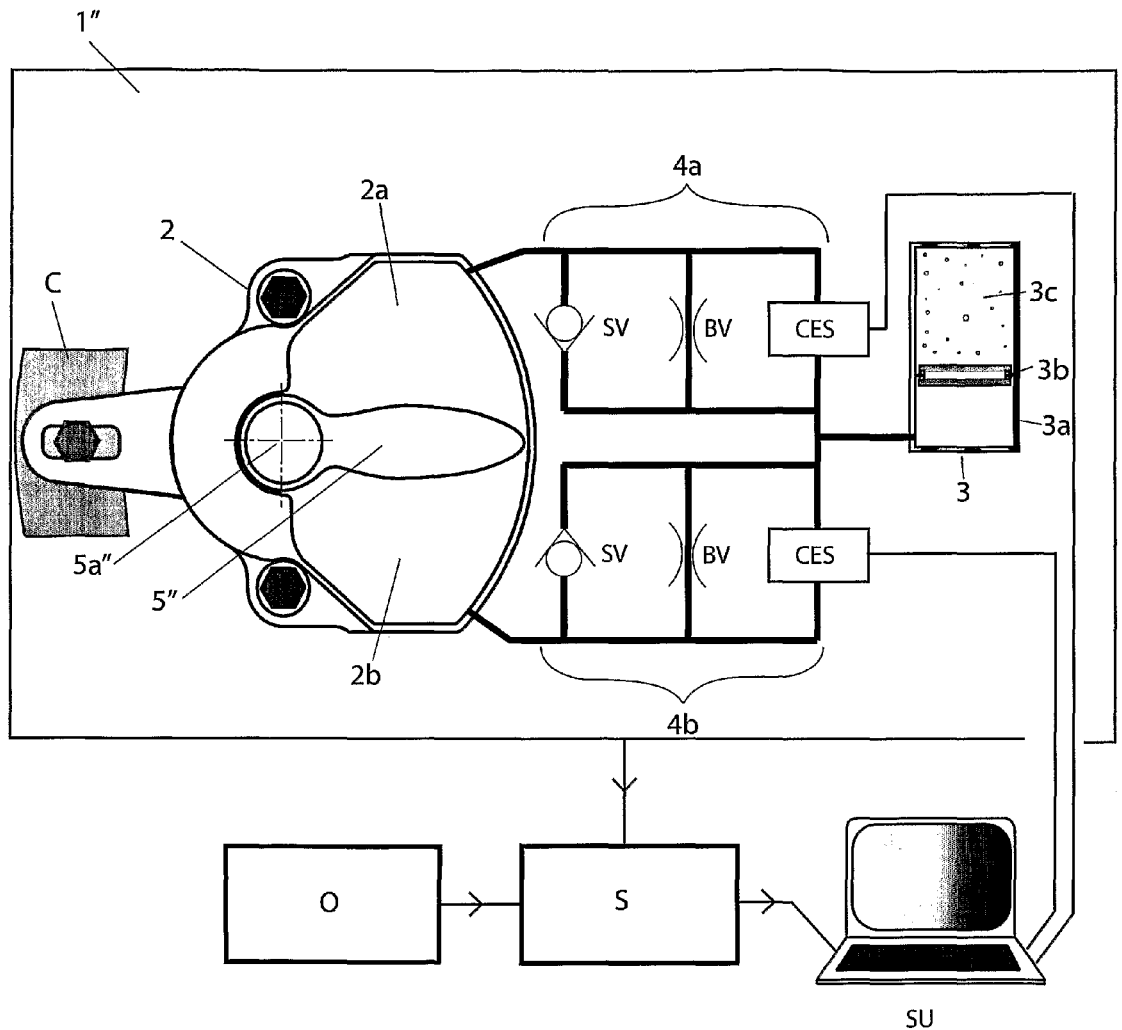
FIG. 2 shows a device that is arranged and configured in accordance with a fourth embodiment of the invention.

With reference to FIG. 2, the illustrated damper device takes the form of a vane damper. The vane damper comprises an outer housing 2 fixed to a vehicle chassis C and divided into two damper chambers 2a, 2b by an arm 5". The vane damper is preferably used as a control damper in which the arm 5" rotates about its one end 5a". The one end 5a" can be coupled to a steering device MP, not shown. When uneven ground or varying road conditions cause a severe movement of the handlebars or wheel of the steering device, the vane damper 1" damps the movement and improves control of the associated vehicle. The valve units 4a, 4b are coupled to both of the chambers 2a, 2b and to the pressurizing element 3 in the same way as in the embodiments described above. The vane damper can also be used to absorb the forces between the chassis and the wheel of a vehicle.

Figures 3A, 3B:
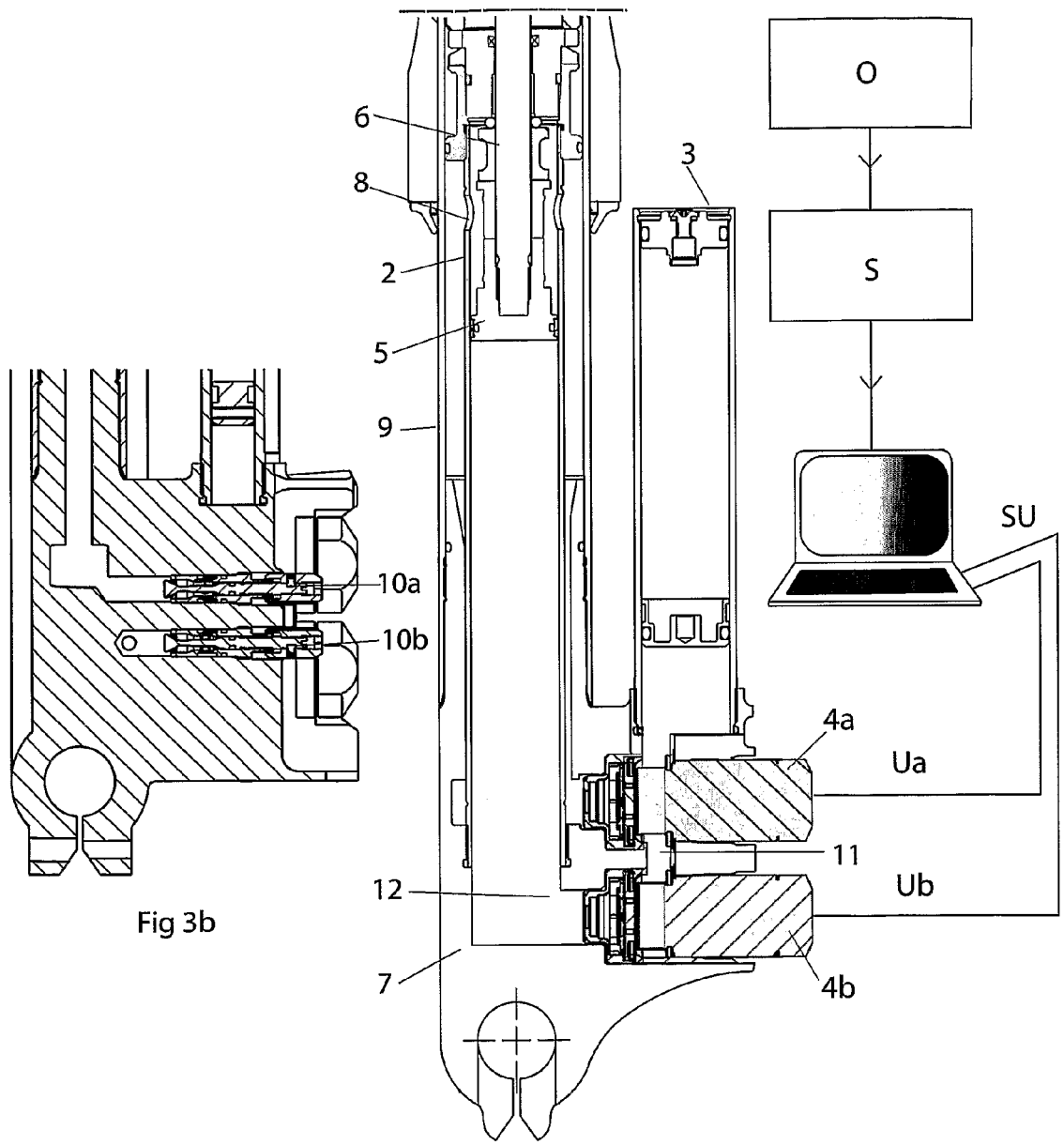
FIG. 3a shows the device fitted to a first type of front fork, taking a section through the adjustable valve.
FIG. 3b shows the first type of front fork, taking a section through the non-return valves.

FIG. 3a shows a front fork with electrically adjustable damping. In the illustrated embodiment, the front fork comprises a piston rod 6 that supports a solid piston 5. The piston 5 is positioned in damper chamber 2. The damper is pressurized by the pressurizing element 3, which is positioned in the bottom piece 7 of the illustrated front fork. The valve units 4a, 4b are also positioned in the same bottom piece 7. The valve units 4a, 4b preferably comprise a non-return valve function and provide an electrically controlled variable valve CES. The leakage flow that occurs at low speeds can be adjusted with two separate bleed valves 10a, 10b, one for the return stroke and one for the compression stroke. The location of the bleed valves 10a, 10b are shown more precisely in FIG. 3b, from which it can be seen that the bleed valves 10a, 10b are arranged generally parallel to the valve housing 4a, 4b. Adjustment of the quantity of medium that is allowed to pass through the bleed valves 10a, 10b, thereby controlling low-speed damping, is done manually from outside with a tool, such as a screwdriver, for example but without limitation.

On a high-speed return stroke, the hydraulic oil flows out through holes 8 in the upper part of the damping cylinder 2 and into the return valve unit 4a through a flow duct between the outer leg 9 and the damping cylinder 2. The flow through the valve unit 4a is adjusted via the signal Ua from the control unit SU. The space 11 between the valve units 4a, 4b is pressurized by the pressurizing element 3 and the damping medium that is allowed to pass through the valve unit 4a is therefore also pressurized before flowing via the non-return valve function of the other valve unit 4b back into the damper chamber 2.

On a high-speed compression stroke, the damping medium flows via the line 12 to and through the compression valve unit 4b controlled via the signal Ub. The medium then passes through the pressurized space 11 between the valve units before passing through the non-return valve function in the valve unit 4a to be led into the flow duct between the outer leg 9 and the damping cylinder 2, in order to finally pressurize the compression side of the piston 5.

Figure 4:
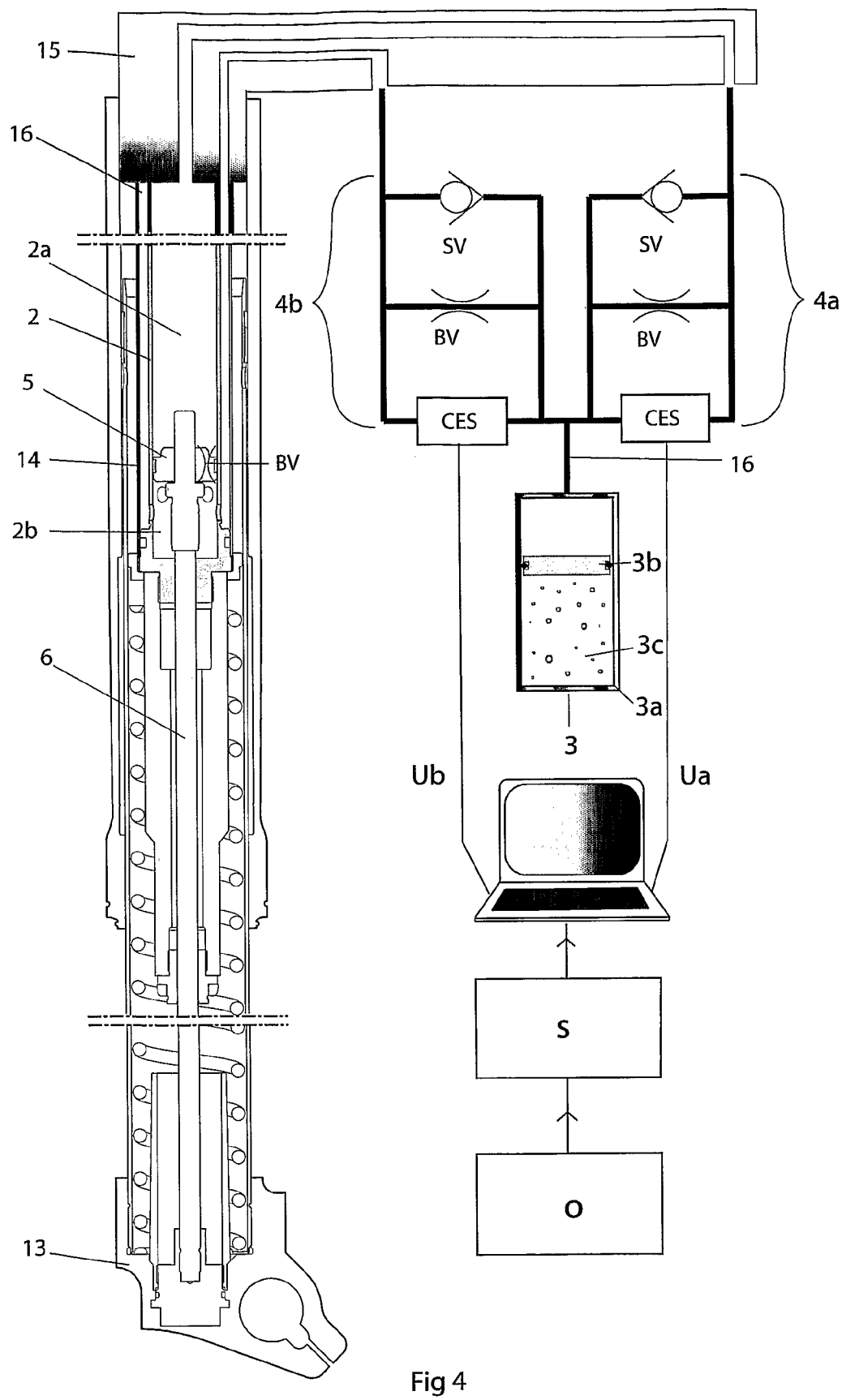
FIG. 4 shows the device fitted to a second type of front fork.

FIG. 4 shows yet another front fork. In the embodiment of FIG. 4, the piston rod 6 is fastened to the bottom piece 13. The damping cylinder 2 is arranged at the upper end of the front fork and a further cylinder 14 is located outside of the damping cylinder. These two cylinders 2, 14 together with the head 15 form a unit 16, which also comprises the valve units 4a, 4b. The valve units 4a, 4b are located generally parallel with one another in turned recesses in the head 15. The valve units 4a, 4b are coupled to the pressurizing element 3 via a flow duct 16. The valve units 4a, 4b are controlled by the control unit SU, which sends the signals Ua, Ub to the main valve CES. The valve units 4a, 4b work on the same principle as in previous embodiments. The piston 5, which is fastened to the piston rod 6, may be solid or may be designed to allow a certain flow to pass through. If a certain flow is allowed through the piston 5, the external valve BV may be of smaller dimensions than in the case of a solid piston 5.

The invention shall not be limited to the description above or the drawings attached, but may be modified without departing from the scope of the patent claims.

The invention claimed is:

1. A device comprising a vehicle damper,
   the damper comprising a damper body, the damper body defining a chamber adapted to receive a damping medium;
   a movable element positioned within the chamber and dividing the chamber into a first subchamber and a second subchamber; and
   one or more valve arrangements comprising a continuously adjustable and electrically controlled main valve, a non-return valve, at least one bleed valve and a plurality of flow ducts, the flow ducts separately connecting a pressurizing element to the first and second subchambers;
   the non-return valve being designed so that the pressurizing element is always coupled to the low-pressure side of the damper;
   wherein the at least one bleed valve works in parallel with the continuously adjustable and electrically controlled main valve that is adapted to vary the flow rate through the one or more valve arrangements such that a damping force characteristic of the damper is adjusted.

2. The device of claim 1, wherein the one or more valve arrangements are arranged adjacent to another valve arrangement in a common housing, the common housing also comprising a connection to the pressurizing device.

3. The device of claim 2, wherein flow through the valve arrangements can be adjusted separately from each other such that flow through one of the valve arrangements does not flow through the other of the valve arrangements.

4. The device of claim 1, wherein the at least one bleed valve is located within the moveable element.

5. The device of claim 1, wherein the damper body comprises a cylinder and the moveable element comprises a piston, the piston being fastened to a piston rod, the piston dividing the cylinder into a compression chamber and a return chamber.

6. The device of claim 1, wherein the damper body is arranged inside a front fork.

7. The device of claim 1, wherein the damper comprises a vane damper and the moveable element comprises an arm that is rotatable about one end.

8. The device of claim 1 further comprising a microprocessor control unit coupled to said one or more valve arrangements.

9. The device of claim 1 wherein the flow through the at least one bleed valve is adjustable separately from the electrically controlled main valve.

10. The device of claim 9, wherein the at least one bleed valve comprises a flow-limiting part and the adjustment of the at least one bleed valve is achieved by exchanging the flow-limiting part with a different flow-limiting part.

11. The device of claim 9, wherein a separate externally actuatable body adjusts the at least one bleed valve, the position of the actuatable body determining the flow through the at least one bleed valve.

12. The device of claim 1, wherein said electrically controlled main valve and said at least one bleed valve are coupled in parallel between said first and second subchambers and said pressurizing element.

13. The device of claim 1, wherein the flow through the at least one bleed valve is predetermined.

14. The device of claim 1 further comprising an electrical, mechanical or hydraulic unit coupled to said one or more valve arrangements.

15. An electronically controlled damper configuration, the configuration comprising a damper and a pressurizing member, the damper comprising a main chamber, a moveable member being positioned within the main chamber and dividing the main chamber into a first chamber and a second chamber, a first flow path connecting the first chamber to the pressurizing member, a second flow path connecting the second chamber to the pressurizing member, a first valve arrangement positioned along the first flow path between the first chamber and the pressurizing member, a second valve arrangement being positioned along the second flow path between the second chamber and the pressurizing member, the first valve arrangement comprising a first one-way valve, a first bleed valve and a first continuously adjustable and electronically controlled valve arranged in parallel with each other, the first continuously adjustable and electronically controlled valve being in communication with a controller such that a damping force characteristic is adjusted by varying the flow rate through the first valve arrangement via the first continuously adjustable and electrically controlled main valve and the first bleed valve being adjustable and being configured such that the pressurizing element is always coupled to whichever of the first or second chamber has a lower relative pressure.

* * * * *

UNITED STATES PATENT AND TRADEMARK OFFICE
CERTIFICATE OF CORRECTION

| | | |
|---|---|---|
| PATENT NO. | : 8,978,847 B2 | Page 1 of 1 |
| APPLICATION NO. | : 12/280464 | |
| DATED | : March 17, 2015 | |
| INVENTOR(S) | : Ishii Atsushi | |

It is certified that error appears in the above-identified patent and that said Letters Patent is hereby corrected as shown below:

In the specification,

In column 2 at line 51, Change "directions" to --direction--.

In column 6 at line 3, Change "therefor," to --therefore,--.

In column 6 at line 57, Change "their" to --the--.

In column 7 at line 10 (approx.), Change "in" to --in a--.

Signed and Sealed this
First Day of December, 2015

Michelle K. Lee
*Director of the United States Patent and Trademark Office*